United States Patent
Duncan

(10) Patent No.: US 6,595,242 B2
(45) Date of Patent: Jul. 22, 2003

(54) TEAR-OUT COUPLING WITH EMBEDDED WIRE

(76) Inventor: Scott Duncan, 3515 Plaintain Ct., Santa Rosa, CA (US) 95403

( * ) Notice: Subject to any disclaimer, the term of this patent is extended or adjusted under 35 U.S.C. 154(b) by 0 days.

(21) Appl. No.: 09/991,155

(22) Filed: Nov. 13, 2001

(65) Prior Publication Data

US 2002/0139427 A1 Oct. 3, 2002

Related U.S. Application Data

(60) Provisional application No. 60/101,758, filed on Sep. 25, 1998.

(51) Int. Cl.⁷ .............................. F16L 55/10; G01M 3/04
(52) U.S. Cl. ............................ 138/90; 138/89; 73/49.8; 73/49.5; 137/68.19; 137/68.27
(58) Field of Search ...................... 138/90, 89; 73/49.8, 73/49.1, 49.5, 46; 277/917, 609, 626, 627; 137/68.19, 68.27

(56) References Cited

U.S. PATENT DOCUMENTS

| | | | | |
|---|---|---|---|---|
| 4,376,597 A | * | 3/1983 | Britton et al. | 405/195.1 |
| 4,429,568 A | * | 2/1984 | Sullivan | 73/49.8 |
| 4,602,504 A | * | 7/1986 | Barber | 138/89 |
| 4,706,482 A | * | 11/1987 | Barber | 73/49.8 |
| 4,936,350 A | * | 6/1990 | Huber | 138/90 |
| 5,033,510 A | * | 7/1991 | Huber | 137/68.19 |
| 5,507,501 A | * | 4/1996 | Palmer | 137/68.11 |
| 6,032,515 A | * | 3/2000 | Huber | 138/90 |
| 6,082,183 A | * | 7/2000 | Huber | 137/254 |
| 6,085,363 A | * | 7/2000 | Huber | 138/90 |
| 6,209,584 B1 | * | 4/2001 | Huber | 138/89 |

* cited by examiner

*Primary Examiner*—Patrick Brinson

(57) ABSTRACT

A unitary removable barrier for installation in a cylindrical water line to selectively block the water line to passage of water therethrough. The unitary removable barrier is composed of a single piece body having at least one cylindrical section sized to receive upstream and downstream pipes of the water line. A unitary planar disk is molded with the cylindrical section and is of a circular circumference which completely blocks the water line when in place but which is selectively removable from the cylindrical section thus removing the barrier to the passage of water through the line.

4 Claims, 3 Drawing Sheets

TEAR-OUT COUPLING WITH EMBEDDED WIRE

This appln claims benefit of Prov. No. 60/101,758 filed Sep. 25, 1998.

TECHNICAL FIELD OF INVENTION

The present invention deals with a unitary removable barrier for installation in a cylindrical water line for temporarily blocking the passage of water through the line. When plumbing a structure such as a house intended to carry water, the structure goes through several waste line tests to confirm the integrity of the various plumbing joints. This requires temporarily blocking the waste line so that the water lines within the structure can be filled and leaks detected. The present invention involves an improved means of temporarily blocking the water waste line in order to create a suitable water head to conduct such testing.

BACKGROUND OF THE INVENTION

When plumbing a structure such as a house, the structure is subjected to at least two different waste water tests. A first test is intended to determine the integrity of the water lines at ground or slab by filling the structure's waste lines with water to create a pressure head. A second test is conducted at "top-out" meaning that after the structure is vented and tubs, sinks and other fixtures are installed, the waste lines are again filled with water to create yet another pressure head. Under pressure, the various lines are inspected for leakage prior to the installation of sheetrock which would obviously mask the detection of any leakage.

As background, plumbers are required to "stub out" or create an external waste line outlet two or three feet from the perimeter of the structural foundation. The "stub out" line is typically capped off in order to run the above-described water tests. There are a variety of currently available caps designed to accomplish this task. For example, a plumber may employ a rubber cap with a stainless steel bands. However, a rubber cap is prone to being blown off of the "stub out" if subjected to sufficient water head pressure. In order to prevent this from occurring, the plumber will oftentimes drive a wooden stake in front of the rubber cap. This entails a good deal of additional effort and is not particularly effective in preventing blow-off. As an alternative, a plumber may glue the plastic test cap to the "stub out" which can be knocked off after the test has been conducted. However, this requires applying and setting a suitable adhesive which obviously must later be removed once the test has been completed. At removal, the plumber is likely to get quite wet as the water head pressure is released. There are additional problems associated with caps employed at "stub out." For example, when a sewer line to the street or septic is about to be connected, the plumber is oftentimes not the party responsible for making the connection. If someone else makes the connection who is unfamiliar with this process, the cap will be cut off or otherwise removed releasing the water head within the structure perhaps prematurely before the plumber has had an opportunity to check the structure for leaks. Even if the plumber is the party responsible for connecting the sewer line to the "stub out," he may still be forced to release his test and then recap the line after the connection has been made thus requiring that the water head be reestablished. This is time-consuming and also is a waste of water. Ideally, the plumber would like to maintain a water head throughout the sheetrock process so that any accidental nailing into the waste line would be visible by observing water leakage.

In addition to the above, once the sewer has been connected, it is traditional for the plumber to return to the project to reset his waste lines at which point a plumber employs a wye, a one-eighth bend and a clean-out plug at the point where the sewer has been connected. A plumber typically employs a long test ball which is inserted into the one-eighth bend and wye and is inflated at the appropriate position. The test ball is intended to temporarily block the waste line to again create a suitable pressure head within the structure. However, these test balls are extremely expensive and by reducing pressure within the test ball, they can be removed and oftentimes stolen from the job site. Further, they can inadvertently lose air, slip down the line and cause a major stoppage which must be dealt with by excavating and exposing the sewer line. The air balls, which exhibit external ribs, crack after repeated usage and tend to leak under tests. Leakage from the side wall of the test ball as well as from its air stem obviously results in water leakage to the sewer and reduction of water head thus reducing the effectiveness of the test.

One way of dealing with this issue has been disclosed in U.S. Pat. No. 5,507,501. The invention disclosed in the '501 patent is to a disk-shaped sealing device which is molded as an integral, unitary piece. The sealing device comprises a circular disc and an angled flange extending outwardly and upwardly from the perimeter of the circular disc. The disc-shaped device fits snugly within a barrel of a plastic fitting such that the circular disc is coaxially received in the barrel of the plastic fitting and the angled flange mates with and lies against a bevel in the barrel of the plastic fitting. A lug extends downwardly from the circular disc whereby first and second elongate grooves are formed in one of the surfaces of the disc. It is taught that the disc-shaped device can be ripped out of the barrel of the fitting so as to remove the device in its entirety from the fitting by pulling on the lug and ripping the circular disc along the first and second grooves in a spiral ripping motion that ultimately pulls the circular disc from the fitting.

Although the invention disclosed in the '501 patent constitutes a dramatic improvement over devices of the prior art described above, it, itself, is not without its limitations. Specifically, the disc-shaped sealing device must be employed only in a waste line which will accept an angled flange. As such, the device cannot be used when a water line is provided with a consistent and uniform interior diameter throughout its length. In addition, the disc-shaped sealing device must, itself, be sealed to the receiving ledge or flange of a waste line to ensure that the disc remains in sealing engagement with the water line during tests. This requires either the use of a glue or wax to ensure that the disc-shaped sealing device remains in place. It is hypothesized that these limitations have prevented the device described in the '501 patent from being universally accepted in the plumbing trade.

It is thus an object of the present invention to provide a means of temporarily blocking a "stub out" or water line which can effectively and temporarily prevent passage of water through the waste line thus creating a suitable pressure head within the structure while being easily removable from the waste line and while addressing all of the drawbacks recited above.

These objects will be more readily apparent when considering the following disclosure and appended drawings.

SUMMARY OF THE INVENTION

The present invention is directed to a unitary removable barrier for installation in a cylindrical water line to selectively block the water line to the passage of water therethrough. The unitary removable barrier is composed of a single piece body having at least one cylindrical section having at least one cross-sectional area and longitudinal axis. The cylindrical section is sized to receive an upstream pipe and downstream pipe of the water line. The unitary removable barrier is further provided with a planar disk located within said at least one cylindrical section and which is characterized as being of circular circumference which completely blocks the cross-sectional area when in place. The planar disk is further provided with a diameter which is substantially perpendicular to the longitudinal axis and is selectively removable from the cylindrical section thus removing the barrier to the water line. This is accomplished by employing a planar disk in which a wire has been embedded within it during its fabrication whereby the wire is removable from the disk causing the disk to shear from the at least one cylindrical section.

DETAILED DESCRIPTION OF THE INVENTION

Figure 1:
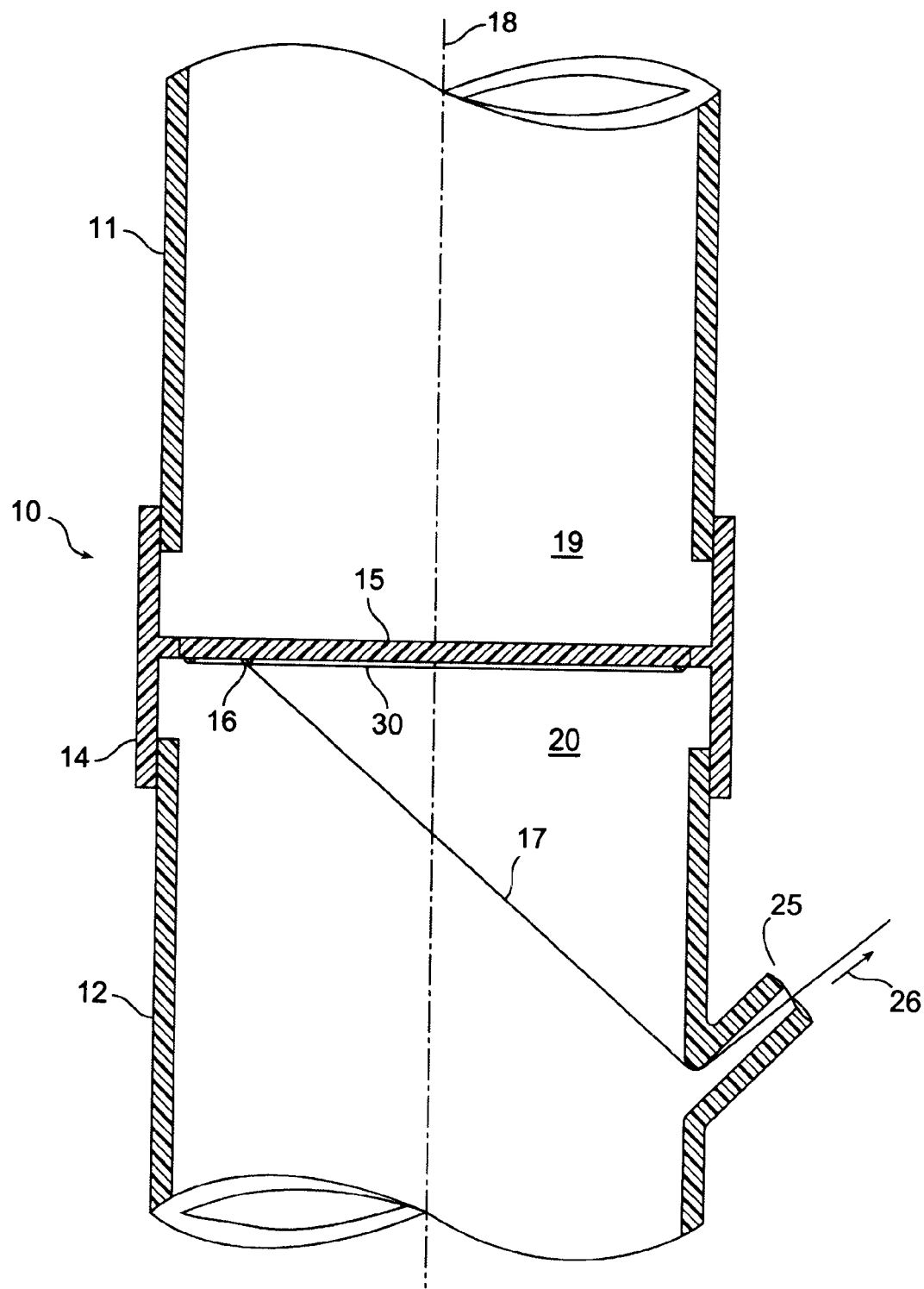
FIG. 1 is a cross-sectional view of the present invention installed within a waste water line.

Turning to FIG. 1, unitary removable barrier 10 is shown in cross-section being installed in a cylindrical water line composed of upstream cylindrical pipe 11 and downstream cylindrical pipe 12 providing for upstream area 19 in which water would accumulate under suitable pressure head during testing while downstream area 20 would remain dry until the barrier of the present invention has been selectively removed.

Figure 2:
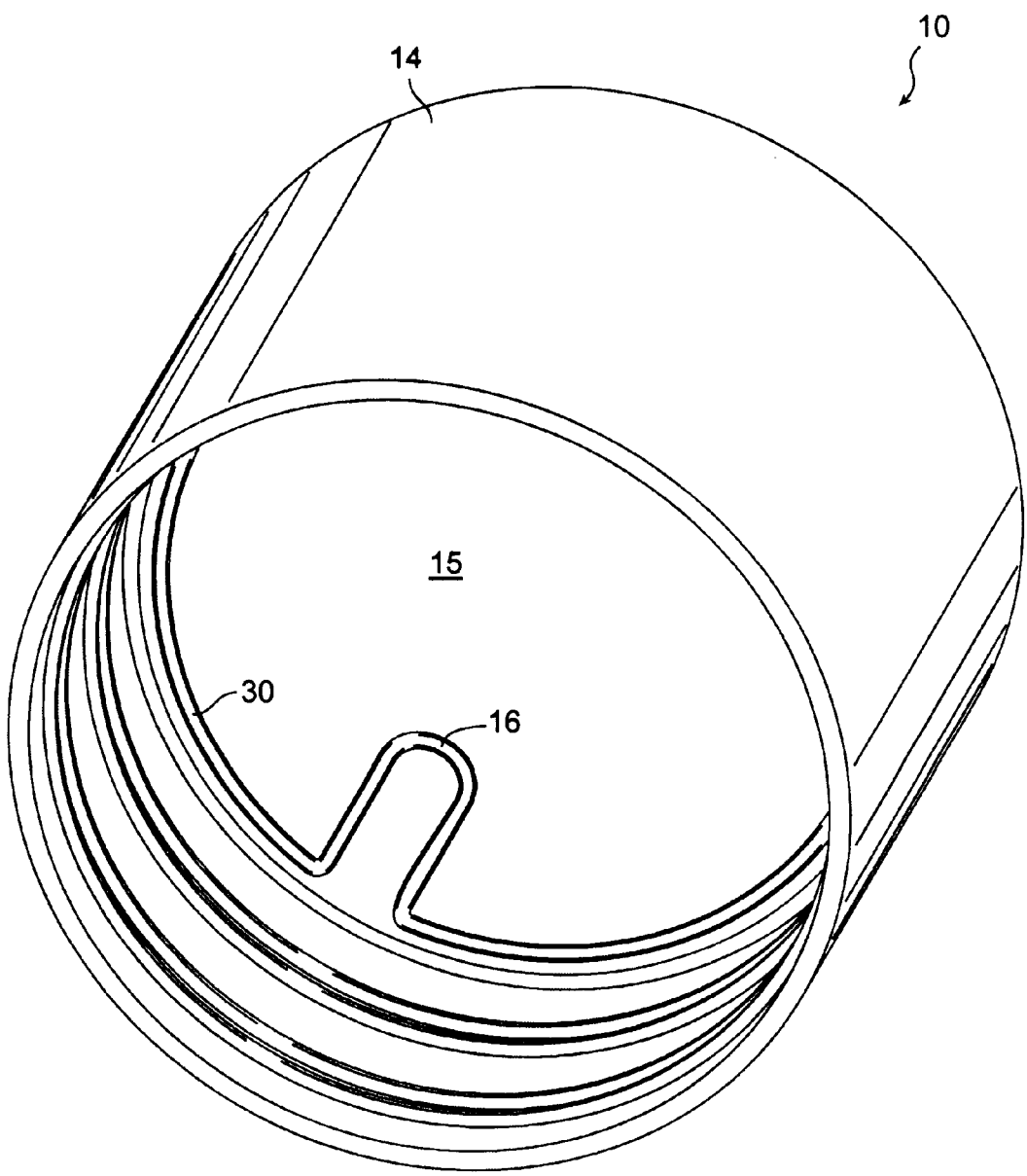
FIG. 2 is a perspective view of the unitary removable barrier of the present invention.
Figure 2A:
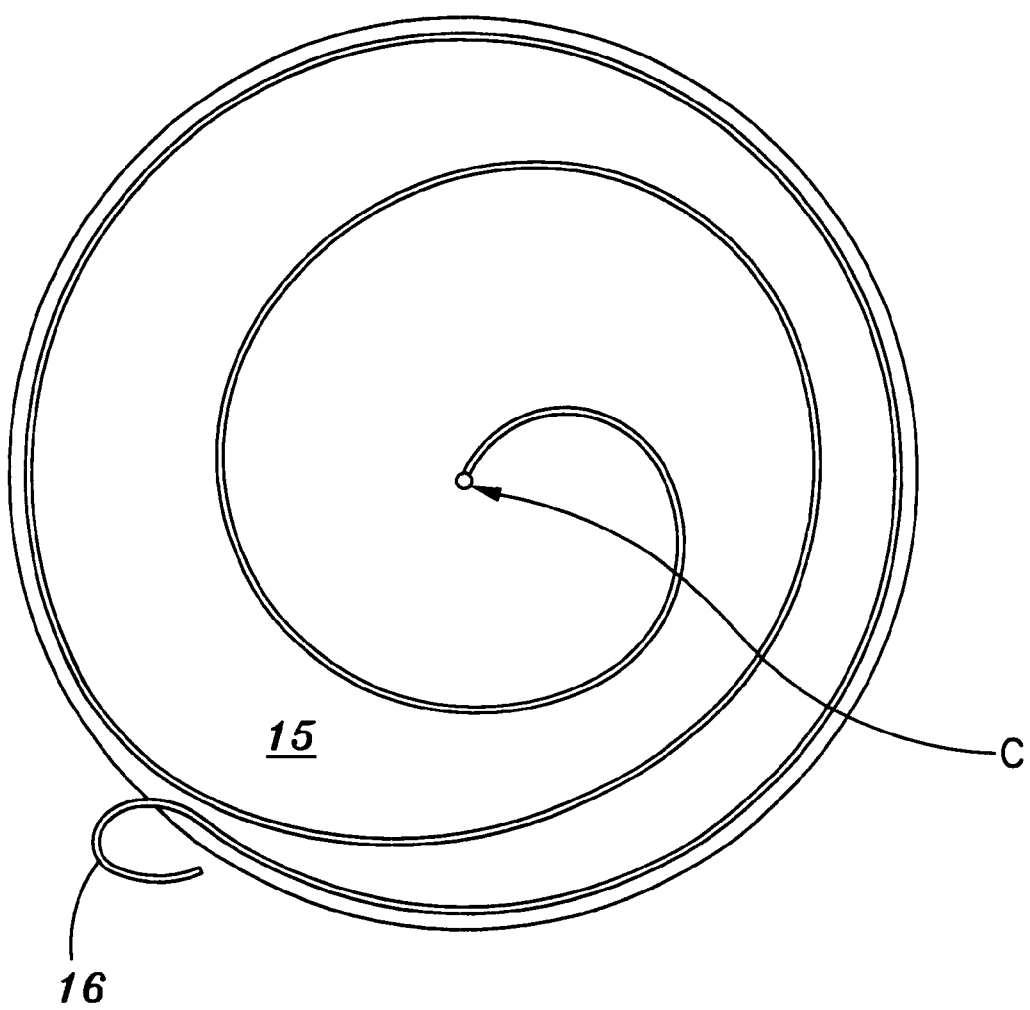
FIG. 2A is a plan view of a planar disk with a helical wire embedded therein.

Unitary removable barrier 10 can be composed of any suitable rubber or plastic and is molded as a single or unitary piece with wire 30 (FIG. 2) embodied therein. As shown in FIG. 2, wire 30 can be configured within planar disk 15 around the circular circumference of planar disk 15. As shown in FIG. 2A, alternatively, wire 30 could be molded in a-helical geometry emanating from the geometric center C of planar disk 15 to its circumference. The purpose for wire 30 will be more expansively discussed hereinafter.

The unitary removable barrier 10 of the present invention is provided with at least one cylindrical section 14, longitudinal axis 18 and is sized to receive upstream pipe 11 and downstream pipe 12 of the water line which are captured preferably by friction fit on either side of planar disk 15. As depicted, planar disk 15 is characterized as being of circular circumference which completely blocks the cross-sectional areas of the water line and provided with a diameter which is substantially perpendicular to longitudinal axis 18.

Planar disk 15 is selectively removable from cylindrical section 10 thus removing the barrier between upstream area 19 and downstream area 20 after a suitable water test has been completed. This is done by providing embedded wire 30 which can, as a preferred embodiment, include wire tab section 16 which can be pried from planar disk 15 at will. This presents a tab as shown in FIG. 1 which can be connected to line 17 which passes through the waste water line and emanates from waste line wye or tee 25.

In operation, a user would install unitary removable barrier 10 as shown in FIG. 1 and perform the desired pressure tests requiring that a water head exists in area 19 whereby water is prevented from proceeding to a municipal sewer system by virtue of planar disk 15. Once these tests have been concluded, the user could pull line 17 in the direction of arrow 26 thus causing embedded wire 30 to be drawn from planar disk 15. This would weaken planar disk 15 sufficiently to rupture the disk along the path of wire 30 thus releasing any water head which exists in area 19 allowing it to proceed through area 20. The then removed planar disk 15 could be, itself, drawn through wye or tee 25 to remove this now unneeded component from the system to avoid its passage to the municipal sewer system to which the waste water line has been connected.

I claim:

1. A unitary removable barrier for installation in a cylindrical water line to selectively block the water line to the passage of water therethrough, said unitary removable barrier being composed of a single piece body having at least one cylindrical section having at least one cross-sectional area, longitudinal axis and sized to receive an upstream pipe and downstream pipe of said water line and a planar disk located within said at least one cylindrical section and which is characterized as being of circular circumference which completely blocks said cross-sectional area, having a diameter which is substantially perpendicular to said longitudinal axis and which is selectively removable from cylindrical section thus removing said barrier to said water line, said planar disk being provided with a wire embedded therein, wherein said wire is removable from said planar disk wherein removing said wire causes said planar disk to be removed from said cylindrical section, said wire is embedded within said planar disk from the geometric center of said planar disk to its circumference along a helical path.

2. The unitary removable barrier of claim 1 wherein a portion of said wire is caused to extend from said planar disk forming a connection to a line, said line extending outside of said cylindrical water line.

3. A unitary removable barrier for installation in a cylindrical water line to selectively block the water line to the passage of water therethrough, said unitary removable barrier being composed of a single piece body having at least one cylindrical section having at least one cross-sectional area, longitudinal axis and sized to receive an upstream pipe and downstream pipe of said water line and a planar disk located within said at least one cylindrical section and which is characterized as being of circular circumference which completely blocks said cross-sectional area, having a diameter which is substantially perpendicular to said longitudinal axis and which is selectively removable from cylindrical section thus removing said barrier to said water line, said planar disk being provided with a wire embedded therein, wherein said wire is removable from said planar disk wherein removing said wire causes said planar disk to be removed from said cylindrical section, said wire is embedded within said planar disk along the circumference of said planar disk.

4. The unitary removable barrier of claim 3 wherein a portion of said wire is caused to extend from said planar disk forming a connection to a line, said line extending outside of said cylindrical water line.

* * * * *

UNITED STATES PATENT AND TRADEMARK OFFICE
CERTIFICATE OF CORRECTION

PATENT NO. : 6,595,242 B2 Page 1 of 1
APPLICATION NO. : 09/991155
DATED : July 22, 2003
INVENTOR(S) : Scott Duncan It is certified that error appears in the above-identified patent and that said Letters Patent is hereby corrected as shown below:

On the title page insert item (73), Name of assignee, MCP Industries, Inc.

Signed and Sealed this

Third Day of June, 2008

JON W. DUDAS
*Director of the United States Patent and Trademark Office*